(12) United States Patent
Slotznick

(10) Patent No.: US 7,137,127 B2
(45) Date of Patent: Nov. 14, 2006

(54) METHOD OF PROCESSING INFORMATION EMBEDDED IN A DISPLAYED OBJECT

(76) Inventor: Benjamin Slotznick, 507 Third St., Mt. Gretna, PA (US) 17064

( * ) Notice: Subject to any disclaimer, the term of this patent is extended or adjusted under 35 U.S.C. 154(b) by 503 days.

(21) Appl. No.: 09/974,132

(22) Filed: Oct. 9, 2001

(65) Prior Publication Data
US 2002/0112093 A1 Aug. 15, 2002

Related U.S. Application Data

(60) Provisional application No. 60/238,908, filed on Oct. 10, 2000.

(51) Int. Cl.
G06F 9/54 (2006.01)

(52) U.S. Cl. ............... 719/329; 719/312; 719/313; 715/738; 715/768; 715/804

(58) Field of Classification Search ........ 719/310–332; 704/200–278; 709/200–253; 715/738, 768, 715/804
See application file for complete search history.

(56) References Cited

U.S. PATENT DOCUMENTS

| | | | | |
|---|---|---|---|---|
| 5,761,656 A * | 6/1998 | Ben-Shachar | ............. | 707/4 |
| 5,801,689 A * | 9/1998 | Huntsman | ............. | 715/733 |
| 5,890,172 A * | 3/1999 | Borman et al. | ......... | 715/501.1 |
| 6,101,473 A * | 8/2000 | Scott et al. | ............. | 704/275 |
| 6,211,874 B1 * | 4/2001 | Himmel et al. | ........... | 345/781 |
| 6,211,877 B1 * | 4/2001 | Steele et al. | ............. | 345/804 |
| 6,233,591 B1 * | 5/2001 | Sherman et al. | ......... | 715/501.1 |
| 6,262,729 B1 * | 7/2001 | Marcos et al. | ........... | 715/744 |
| 6,385,655 B1 * | 5/2002 | Smith et al. | ............. | 709/232 |
| 6,441,834 B1 * | 8/2002 | Agassi et al. | ............. | 345/764 |
| 6,442,523 B1 * | 8/2002 | Siegel | .................. | 704/270 |
| 6,477,550 B1 * | 11/2002 | Balasubramaniam et al. | ............. | 715/513 |
| 6,539,359 B1 * | 3/2003 | Ladd et al. | ............. | 704/275 |
| 6,643,621 B1 * | 11/2003 | Dodrill et al. | ............. | 704/275 |
| 6,662,310 B1 * | 12/2003 | Lopez et al. | ............. | 714/15 |
| 6,721,951 B1 * | 4/2004 | Williams et al. | ............. | 719/329 |
| 6,803,929 B1 * | 10/2004 | Hinegardner et al. | ....... | 715/769 |
| 6,865,599 B1 * | 3/2005 | Zhang | .................. | 709/218 |
| 6,993,712 B1 * | 1/2006 | Ramachandran et al. | ... | 715/513 |
| 2002/0178007 A1 * | 11/2002 | Slotznick et al. | ........ | 704/270.1 |
| 2003/0101235 A1 * | 5/2003 | Zhang | .................. | 709/218 |
| 2003/0132967 A1 * | 7/2003 | Gangadharan | ............. | 345/769 |
| 2004/0103364 A1 * | 5/2004 | Dornback | ................ | 715/501.1 |
| 2005/0268224 A1 * | 12/2005 | Hanson et al. | ............. | 715/513 |

OTHER PUBLICATIONS

Detert, Ryan. "Drag and Drop with Microsoft Internet Explorer 5." Feb. 13, 2000.*

Fulton, Jennifer et al. "Netscape Navigator 6 in 1." Que Corporation. 1996, pp. 215-227.*

(Continued)

*Primary Examiner*—Lewis A. Bullock, Jr.
(74) *Attorney, Agent, or Firm*—Akin Gump Strauss Hauer & Feld, LLP

(57) ABSTRACT

Information embedded in a displayed object is transferred from one browser window to another. Each of the browser windows display a Web page. The object is displayed on one of the Web pages and, by "dragging" and "dropping" the embedded information to the other Web page, a function is performed on the embedded information, such as one that converts text associated with the embedded information into an audible output. A user who has difficulty reading text displayed on a Web page can click on an image embedded in the text, or drag and drop the information embedded in the displayed image to another Web page used to perform the conversion function.

26 Claims, 5 Drawing Sheets

OTHER PUBLICATIONS

Audax Tros Multimedia. "Text to Speech v 0.13 (beta)." 1997.*

Knowland, Luke. "Make Web Pages Speak with the Talker Plug-in." Aug. 23, 1996.*

Fulton, Jennifer et al. "Netscape Navigator 6 in 1."Lessons 2 and 3, pp. 16-28. Que Corporation. 1996.*

Speaks for Itself Talking Web Sites, printout from web site: http://www.speaksforitself.com/speaksforitself/talkingsites.cfm?CFID=1327376&CFTOKEN=48412529 DirectXtras, Inc., printout date: Feb. 15, 2002, original web page posting date: unknown, 4 pages.

Microsoft Agent 2.0 Setup (includes step to Install the Lernout & Hauspie TruVoice Text-to-Speech Engine), printout from web site: http://www.msagentring.org/setup.htm printout date: Feb. 15, 2002, original web page posting date: unknown, 2 pages.

HELP Read Beta .92, printout from web site: http://www.davecentral.com/projects/helpread/ printout date: Feb. 26, 2001, original web page posting date: unknown, 2 pages.

CAST eReader, printout from web site: http://www.cast.org/udl/index.cfm?i=211 printout date: Feb. 26, 2001, original web page posting date: unknown, 5 pages.

JAWS Screenreader for the Blind and Visually Impaired, printout from web site: http://www.worklink.net/jaws.htm, printout date: Feb. 20, 2001, original web page posting date: unknown, 1 page.

Parsing with Perl Modules by Teodor Zlatonov, printout from IBM site: http://www-106.ibm.com/developerworks/linux/library/perl-parsing/ printout date: Feb. 15, 2002, article date: Apr. 2000, 6 pages.

* cited by examiner

METHOD OF PROCESSING INFORMATION EMBEDDED IN A DISPLAYED OBJECT

CROSS-REFERENCE TO RELATED APPLICATIONS

This application claims the benefit of U.S. Provisional Application No. 60/238,908, filed Oct. 10, 2000, entitled "A METOD OF USER TRANSFER OF INFORMATION FROM ONE WEB PAGE TO ANOTHER AND USER ACCESS TO TEXT INFORMATION THAT THE USER HAS DIFFICULTY READING."

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Many current computer programs that operate with a graphical user interface allow "drag and drop" methods to move objects from one place to another, either within a program or electronic document, between programs or electronic documents, or within the system files of the computer or its network. However, security concerns have prompted limitations on this technology with respect to browser programs. A major concern has been to prevent information from passing from one browser window to another, unbeknownst to the user, and then passing back over the Internet to others.

Currently, if a simple image embedded in a Web page is displayed in one browser window on a user's computer and the user then drags that image into another browser window on the same computer, the second browser window will display the image. However, it will not display any information contained in the image tag. Text cannot in general be dragged from one browser window to another browser window, but only to a text box displayed in the second browser window.

Currently if a clickable link (whether a text link or an image that acts as a clickable link) is displayed in one browser window, and that linked object is dragged into another browser window, then that second browser window will not display the text or image, or any information within the text, image, or associated tags. Rather the second browser window will "execute" the linkage, that is, the second browser window will navigate to the website to which the text or image links.

Many people have difficulty reading any specified text document, even if they are not blind. People have difficulty reading a document that is not written in their native or ethnic language. (In the United States, this literacy problem is attacked by the special educational programs and efforts referred to as "ESL" programs or "English as a Second Language".) People have difficulty reading a document that is written with technical terms that they are not familiar with. People have difficulty reading a document that is written with more difficult words or sentence constructions than they are competent to decipher. (For example, in the United States, almost a quarter of the adult population reads at or below the fourth grade level and has difficulty reading and understanding the directions on the back of a medicine bottle.) Other people have difficulty reading any text because of dyslexia, mental retardation, or various developmental disabilities. Other people have difficulty reading because of cultural or educational disabilities.

Some electronic texts (such as some websites) provide alternate texts in a few different languages. Some websites provide automated machine translation of any text or Web page that is submitted to them, by displaying text in the requested language. There are a variety of text-to-speech software packages that a user can install and submit text to, whereby the text is converted to the sound of a synthesized voice speaking the words. These applications generally require that the user is competent with reading and manipulating high school level text in at least one language. Text-to-speech browsers are also expensive for those in the lower socio-economic levels, frequently costing end users over $100. Use of such specialized browsers is also likely to stigmatize the users who may otherwise effectively hide their reading difficulties.

Some electronic texts embed audio clips, such as songs, interviews, commentary, or audio descriptions of graphics. However, production time and storage capacity requirements limit their use.

BRIEF SUMMARY OF THE INVENTION

The present invention allows a programmer to embed information, instructions or data within a tag associated with a text or image object (rather than in the image itself) or other object on a Web page, in such a manner that a user who is displaying the Web page in a browser window on a computer, can transfer that information, instructions or data to a Web page that is displayed in another browser window on the same computer by "dragging" and "dropping" that image from one browser window to another—or alternatively, by a cutting and pasting operation. This transfer of information will occur within the security constraints placed upon browser-based information transfer, which generally prevents information from being passed between Web pages (and their containers) that do not originate from the same source.

The present invention allows a user who has difficulty reading a specified text displayed on a computer monitor to hear that text spoken, in original, translated or simplified form, by clicking on an image embedded in the text or by dragging and dropping that image to a specified place on the monitor.

The present invention includes a method of processing information embedded in a displayed object. The information is formatted as a function call containing an argument. The embedded information is transferred from a first Web page displayed in a first browser window to a second Web page displayed in a second browser window. The function call is stored in a memory. The function call is then retrieved from the memory and an operation on the argument of the retrieved function call is executed.

The method may further include activating a plug-in program associated with the function call and using the plug-in program to execute the operation on the argument. The argument may be a text string which is converted into an audible output by the plug-in program. The text string may be executed by the plug-in program in response to a user clicking on an icon displayed in the second browser window.

The process of transferring the embedded information may include (i) placing a cursor over the displayed object in the first browser window, (ii) capturing the embedded information, (iii) moving the captured embedded information to the second browser window, and (iv) releasing the embedded information in the second browser window.

The embedded information may be located within a link tag. The function call may be selected from the group including a Java function, Javascript function and a VBscript function. The function call may include href data. The function call may include a variable denoting the language in which the text string is written. The function call may include data used to define an image displayed by the second browser window. The function call may be used to implement a defined function accessed by or embedded in script contained in the second Web page. The function call (or "FC") may include other computer language processes such as methods, scripts, executable code, executable instructions or the like.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
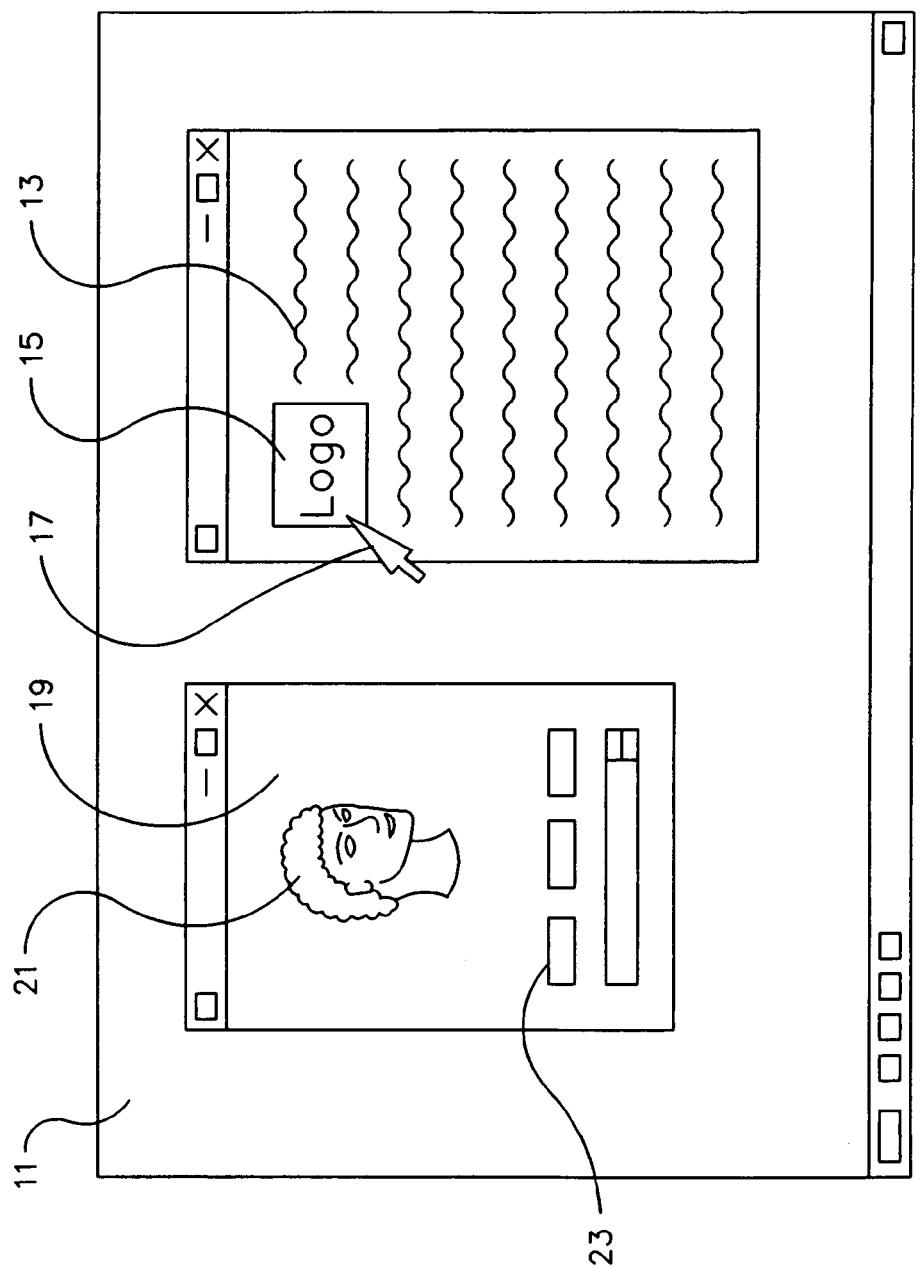
FIG. 1A shows a screen-shot of a computer screen in which the cursor of a pointing device such as a mouse or touch pad has been placed on an image (in this case a graphic of the word "LOGO") in one window on the screen.

Certain terminology is used herein for convenience only and is not to be taken as a limitation on the present invention. In the drawings, the same reference letters are employed for designating the same elements throughout the several figures.

1. Overview of Present Invention

A preferred embodiment of the present invention is capable of transferring information embedded in a displayed object from one Web page displayed in a browser window ("Web page 1") to a second Web page ("Web page 2") which is displayed in another browser window. A displayed object is an object that is visible to a user's eye. The displayed object may be a graphic object or text within a link tag.

Web page 2 and its containing browser window are designed to accept the transferred information in the following manner. (1) The information to be exchanged accompanies an image or text object in Web page 1. (2) The image or text object is placed within link tags, but the "href" variable (the website to be linked to) consists of a "function call" (including but not limited to a function call, a method call, or other programming command in a programming language such as, but not limited to, Java, Javascript, VBscript, etc.) that contains as an argument, the data or information to be exchanged between browser windows/ Web pages. (3) The function call references and calls a defined function accessed by or embedded in script contained in Web page 2. (4) The browser program is coded to execute imported function calls from cached code if possible before refreshing the Web page from the network. (5) The browser program is coded (a) to export embedded function calls to the clipboard on the copy function, when an object in which the function calls are embedded is copied and (b) to import the function calls from the clipboard when that browser has the focus of the pointer and the paste command is triggered. (6) The browser program is coded (a) to export embedded function calls to the memory controlled by the drag and drop subroutine, when an object in which the function calls are embedded is dragged somewhere and (b) to import the function calls from the drag and drop memory when that browser has the focus of the pointer and the drop command is triggered. This embodiment may require plug-in or add-on programs for particular browsers, or rewriting browser code.

In this embodiment of the invention, dragging and dropping the object with embedded information to the second window changes the appropriate variable within the programming code of the target window to the value contained in the function call and executes that command.

A preferred embodiment of this invention is a program that reads "captions" aloud using text-to-speech technology. A "caption" is a hidden text message embedded in a logo type image (referred to as the "LOGO"). (Actual file names and locations of the program have been changed for this example.) Different instances of the LOGO may have different text messages. In particular, this programming example uses a browser plug-in from Haptek which includes Haptek animation technology and incorporates text-to-speech technology called DECtalk (originally developed by Digital Equipment Corporation). These two commercially available technologies generate an animated head that "speaks" any text placed into the "text" variable submitted to the program to execute. Methods for creating individual pages with the Haptek animated talking heads are detailed on the Haptek website and are known to those knowledgeable in the art.

This particular program is written for use with a personal computer using a Microsoft Windows operating system. This is because the Haptek plug-in currently only runs on Windows personal computers although a similar animation program could be written for computers using other operating systems. The Haptek plug-in has certain minimum hardware requirements such as processor speed and sound card specifications. The program embodying the invention is written in Javascript for use with a personal computer using the Internet Explorer browser from Microsoft (October 2000 version) because that browser will execute Javascript function calls pasted from the drag and drop memory if the commands are valid within a Javascript programming script running on the displayed page. The October 2000 versions of Microsoft Internet Explorer support these features of the invention when running on either Windows 95/98 personal computers or the latest Apple MacIntosh computers. The Netscape browser as of October 2000 did not at that time fully support these features of the present invention.

The LOGO image is based on an image file called LOGO.gif, for purposes of the example, the image is assumed to be stored on the simtalk.com website in the following file: http://www.simtalk.com/graphics/LOGO.gif.

The LOGO image is embedded in Web pages, including Web page 1, using the following code.

<a href="javascript:SpeakCaption('Thank you for visiting our website. On this page the boss will share her ideas and hopes with you.')"><img name="LOGO" src="http://www.simtalk.com/graphics/LOGO.gif"></a>

The Javascript function call "SpeakCaption" contains as an argument, the text string: "Thank you for visiting our website. On this page the boss will share her ideas and hopes with you." When this text string is entered into the Haptek/DECtalk plug-in, the animated heads will speak the words. This message can be set by the authors of Web page 1 without the specific knowledge of the authors of Web page 2, as long as the message is within the length parameters set by the script. The Web page 1 may contain more than one instances of the LOGO with different messages embedded in the different instances.

The LOGO image will appear on Web page 1 as a clickable image with an embedded link. However clicking on the image when using Microsoft's Internet Explorer (October 2000 version) does not result in any discernible action being taken. Although the Javascript function named "SpeakCaptions" is called, the definition of this Javascript function on Web page 1 (or referenced .js scripts) is only designed to trap errors, such as by placing the text message into the "text" variable, but is not designed to do anything with that variable, and in particular is not designed to convert the text message into speech or sound. Web page 1 must also contain scripting to prevent error messages when people using other browsers attempt to click on the image.

Web page 2 contains coding that launches an instance of the Haptek plug-in according to Haptek specifications. Web page 2 also displays a button image labeled "READ". Clicking on the "READ" button submits the text string in the "text" variable to the Haptek plug-in, causing the text string to be read aloud by the DECtalk software. Web page 2 also contains a Javascript file with the following code (the "Script"):

```
<SCRIPT
.....
function SpeakCaption(text)
{
    text = escape(text)
}
.....
</SCRIPT>
```

When such pages are viewed using Microsoft Internet Explorer (October 2000 version) on a personal computer with Windows 95/98 operating system, the user can drag the LOGO image from any Web page to a window which contains a Web page or program running the Script. The user does this by placing the pointer device (such as a mouse) on the LOGO image in Web page 1 (see FIG. 1A) and pressing down on the left mouse button (or equivalent pointer action). Then, while still holding down the left mouse button (or executing an equivalent pointer action), the user moves the pointer onto Web page 2 with the animated head (see FIG. 1B) and then releases the left mouse button (or equivalent pointer action). Because of the way Microsoft Internet Explorer (October 2000 version) caches Web pages and Javascript code, the window containing the animated head does not refresh itself, but rather changes the value of the "text" variable. When the "READ" button is pressed, the talking head in Web page 2 speaks the message that has been dragged from Web page 1.

In an alternative embodiment of the invention, the changes in the text variable in Web page 2 will cause the variable to be automatically submitted to the Haptek plug-in associated with Web page 2 for conversion to speech.

In an alternative embodiment of this invention, the SpeakCaption command can be designed to accept a second variable which denotes the language in which the text is written. Digital Equipment Corporation created different code to read different languages, because letter combinations are spoken differently in different languages. Even words that are spelled the same in two languages may be spoken differently. With a second variable, the text-to-speech engine knows which pronunciation subroutine to use.

In an alternative embodiment of the invention, the variable which denotes the language will cause an automatic translation program to translate the message from the language in which the message has been written to the language of the active DECtalk software and then place that translation into the "text" variable to be converted to speech.

In an alternative embodiment of the invention, different images are used with the embedded data. For example, the Haptek animations will change shape when given certain function calls, such as changing the shape of the animated head from a dog to a cat, or from a woman to a man. In the alternative embodiment, one image (e.g. an image of a cat) contains the function call to change the head to a cat's. Another image (e.g. the image of a man) contains the function call to change the head to a man's. Dragging the various images to the target window causes the head to change in accordance with the embedded data in the image. Of course, multiple arguments in the embedded data could have the head change to a specific shape and speak specific words. For example, dragging and dropping a cat image might cause the head to change to the shape of a cat and speak the words "Meow meow" whereas dragging and dropping a man image might cause the head to change to the shape of a man and speak the words "Let's watch football and drink some beer." The programmer who codes Web page 2 decides what actions can be controlled by the author of Web page 1, although the author of Web page 1 may have considerable choices.

An example of this embodiment embeds a cat image (named "cat.gif") in Web page 1 using the following code:

<a href="javascript:SpeakChange('cat', 'meow meow')"><img name="cat" src="cat.gif"></a>

The image file cat.gif is stored on the same server file as Web page 1.

Web page 2 includes an embedded animated head using Haptek technology and the following Javascript code:

```
<SCRIPT
.....
function SpeakCaption(text)
{
    text = escape(text)
}
.....
function SpeakChange(shape, text)
{
switch(shape)
{
case "bird":       UseMorph("Macaw4");
UseTexture("mapLizard512.jhp", "R");
break;
case "cat": UseMorph("cat");
UseTexture("mapCat512.jhp", "R");
break;
.....
case "burger":     UseMorph("burger3");
UseTexture("mapBurger512.jhp", "R");
break;
default:       UseMorph('roswell f0=0.01');
UseTexture('head/mapElijah512.jhp', 'DB1');
};
SpeakCaption(text)
}
.....
</SCRIPT>
```

This embodiment makes use of the same SpeakCaption function described in the previously disclosed script along with other code, but other embodiments of the invention need not use the same (or any) SpeakCaption function.

The SpeakChange function contains a subroutine labeled "switch" that changes the shape of the head in a variety of ways, such as to a cat, a bird or a hamburger. Other possible shape changes are not enumerated in this example. A default shape is also provided. The SpeakChange function, after changing the shape of the head, calls the SpeakCaption function so that the head recites the second argument (the text string) of the SpeakChange function.

As previously described, in this embodiment, dragging and dropping the cat image from Web page 1 to Web page will cause the Haptek animated head in Web page 2 to change shape to that of a cat. When the "READ" button in Web page 2 is clicked, the cathead will say "Meow meow."

In an alternative embodiment of the invention, Web page 1 contains a script with a different definition of the Speak-Caption function. In this embodiment, the SpeakCaption function opens a new window and causes that window to navigate to Web page 2 and then places the text argument into the text variable. In this embodiment, when the user clicks on the image in Web page 1, a new browser window with Web page 2 is opened. Clicking on the "READ" button in Web page 2 causes the Haptek head to speak the message in the LOGO. (This much works even when using the October 2000 Netscape browser.) If the user has already opened Web page 2, this clicking on the image in Web page 1 just refreshes Web page 2. Scripting in Web page 2 does not contain the code to open new windows so dragging and dropping any LOGO from Web page 1 to Web page 2 does not open any new windows but only causes the text message to be placed into the "text" variable in Web page 2.

In an alternative embodiment of the invention, the Speak-Caption function also contains an argument that specifies the URL of some Web page. The definition of SpeakCaption in Web page 1 causes the browser to navigate to this URL, whereas the definition of SpeakCaption in Web page 2 causes the Haptek head to speak a message. In this embodiment, the image will act similarly to any other image link when clicked upon, but will "deliver" data to another Web page when dragged to it and dropped on it.

In an alternative embodiment, the link tags do not contain an image, but rather text. The text is then repeated as the first argument in the SpeakCaption function with a URL as an additional argument in the SpeakCaption function. The text will appear as a standard text link in Web page 1. When clicked on by the user, it will function as if it were a standard text link, and navigate to the specified URL. However, when dragged and dropped into a browser window containing Web page 2, the Haptek head in Web page 2 will speak the text of the link. In an alternative embodiment, SpeakCaption also contains an argument specifying the language in which the text is written, so that the Haptek head will pronounce it correctly, or translate it, as described above.

This embodiment is not limited to image or text objects, but can accommodate other clickable objects that contain a link tag.

An alternative embodiment of the invention eliminates the animated head, but retains the text-to-speech features disclosed above. In this embodiment, Web page 2 is displayed in a significantly smaller window than previously described because the space used to display an animated head is eliminated. This allows Web page 1 to be displayed in a larger window (if the user so desires), or otherwise take up more screen space, increasing ease of navigation within Web page 1.

The foregoing embodiments demonstrate how dragging and dropping an image (or object) from one Web page to another causes text embedded in that image (or object) to be spoken in original or translated form. At the Web page author's choice, that text duplicates the text shown in the Web page, or offers a simplified or alternate version of the displayed text. An alternative embodiment builds the inventions software into the browser's source code, or adds the software as an add-on or plug-in. In this embodiment, dragging the image (or object) to a pre-specified portion of the browser task bar will cause the text in the image (or object) to be read (with or without an animated head to lip sync the words). In an alternative embodiment, the software is built into the browser, but is activated by clicking (or double clicking) on the image. In this embodiment, clicking on the image (or object) will cause the embedded text to be spoken in original or translated form.

In an alternative embodiment, the present invention is built into other computer programs that display text, such as Adobe's Acrobat Reader, Microsoft Word, and various e-mail programs.

This embodiment is not limited to image or text objects, but can accommodate other clickable objects that contain a link tag.

In an alternative embodiment, the browser software itself is modified through re-coding, plug-ins or add-ons in order to recognize a "data" argument within object tags. For example, an argument such as "data=' ... '" is placed inside an image tag on Web page 1. When that image is dragged and dropped (or copied and pasted) to another browser window displaying Web page 2, the drag and drop memory copies the data argument. Then the browser checks to see if the argument can be executed by the script and code in Web page 2 and, if so, the argument is executed. Otherwise, no action is taken. All event handlers in Web page 1 (including those in its scripts and tags) otherwise act and behave according to current standard practice. In this embodiment, link tags and on-click functions are treated in standard fashion.

In an alternative embodiment, the invention is implemented via SMGL and/or XML tags with a browser that support such tags.

2. Detailed Description

Figure 1B:
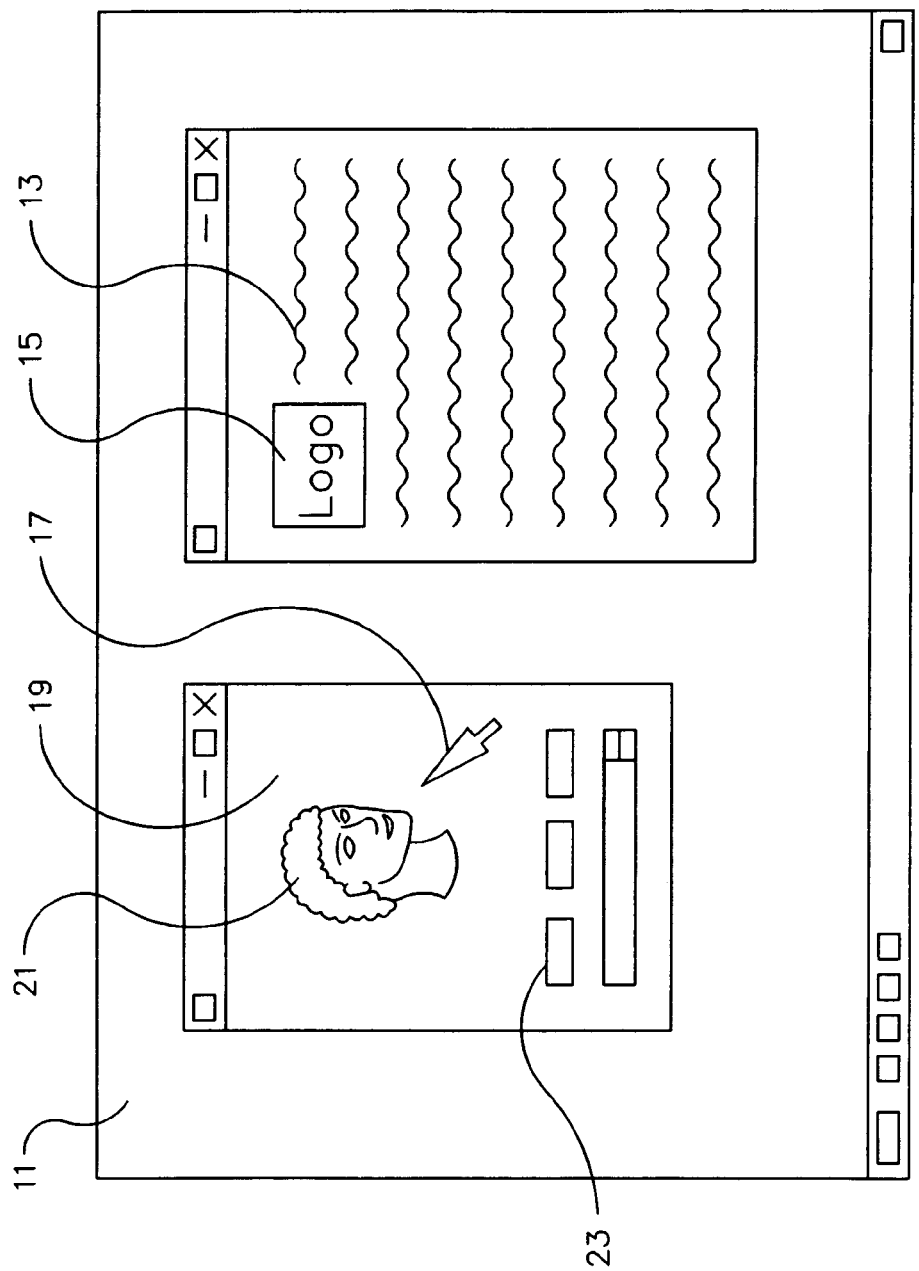
FIG. 1B shows a screen-shot of the same computer screen as shown in FIG. 1A but in which the cursor of the pointing device has been placed within a different window on the screen.

FIG. 1A shows the screen, 11, of a computer when the user is about to make use of the invention. Displayed on the screen are two browser windows, 13 and 19. Web page 1 is displayed in one browser window, 13 and Web page 2 is displayed in the other browser window, 19. Web page 1 contains an image, 15, which in this case is a graphic of the word "LOGO". Other instances of the invention use different graphics and images. Web page 2 contains an embedded animation of a Haptek head, 21, and an image of a button labeled "READ", 23. Web page 2 contains a script with the variable "text". When the variable is "submitted" to the Haptek plug-in software, the DECtalk software converts the text string to speech through the use of the computer's sound card (not shown). While the sound of speech is coming from the computer's loudspeaker (not shown), the Haptek software animates the head, 21, including moving the lips of the head so that the head appears to lip sync or speak the words which the DECtalk software has converted into sound.

FIG. 1A also shows the cursor, 17, of the user's pointing device appearing on the screen as if it were placed over the LOGO, 15. The cursor may take forms and shapes other than a pointer. Some cursors look like a hand with an extended index finger pointing. This is particularly the case when the cursor is placed on a clickable link. (This version of a cursor is not shown.)

To drag and drop the embedded information from Web page 1 to Web page 2, the user holds down the left mouse button (not shown) while the cursor, 17, is placed on the LOGO, 15. A pointing device other than a mouse may be used, in which case a pointing device button is held down. Some pointing devices have equivalent but different user actions that may be employed.

While continuing to hold down the left mouse button (or analogous action), the pointing device is moved so that the cursor moves into the browser window, 19, which contains Web page 2. This is shown more particularly in FIG. 1B. The user then releases the left mouse button (or analogous device). The script in Web page 2, then places the hidden message into the "text" variable.

The user then clicks on the "READ" button, 23, on Web page 2 and the Haptek head, 21, appears to speak the text message while the sound of the spoken words comes from the computers speakers (not shown).

Figure 2A:
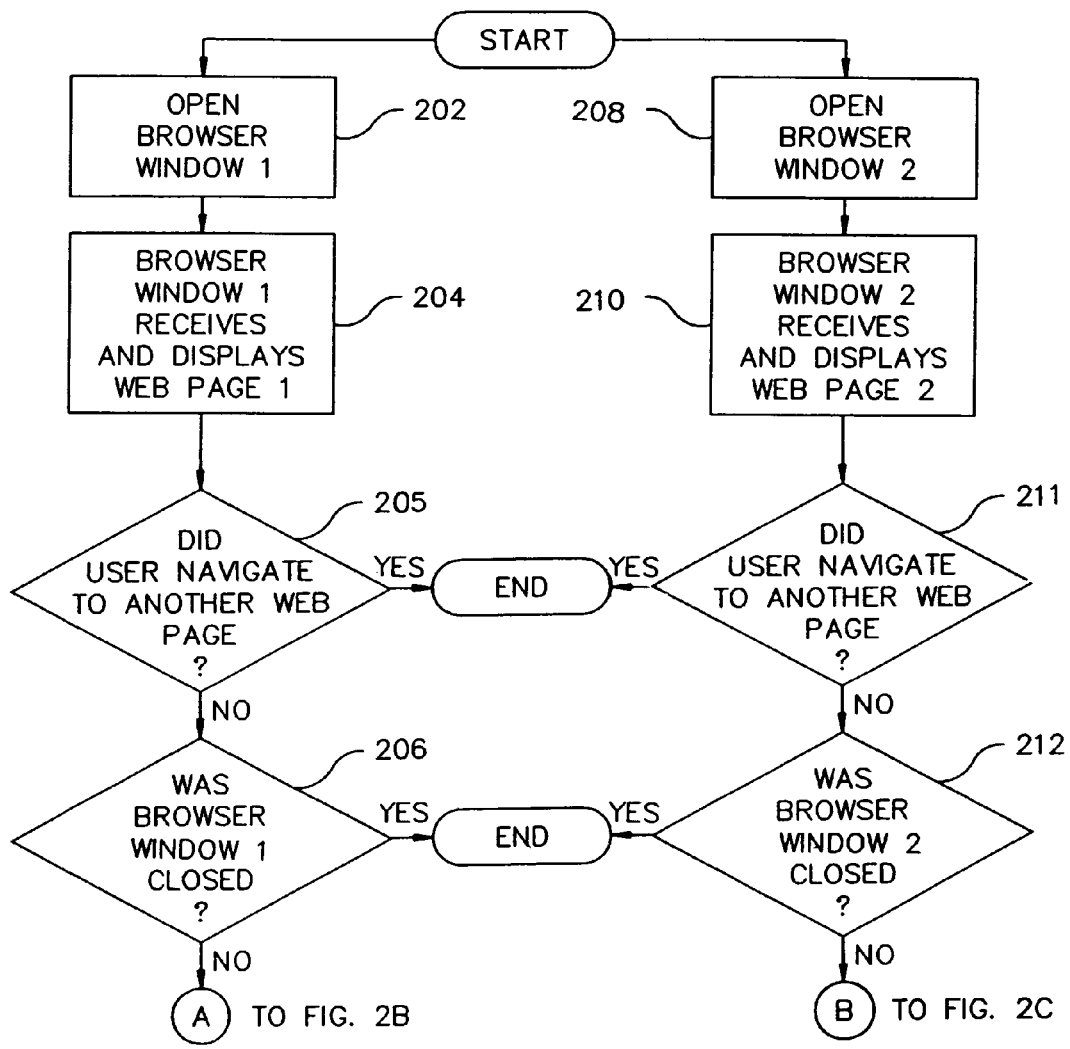
FIGS. 2A, 2B and 2C, taken together, represent a flow chart which shows the process of transferring information embedded in a displayed object from one Web page to another.

Referring now to FIG. 2A, the previously described actions are presented in the form of a flow chart which shows how the present invention is employed by the user. A user operating a personal computer connected to the Internet opens a first Browser Window (step 202) and a second Browser Window (step 208). It is not material which browser window has been opened first. In one embodiment, one browser window may be a child window to the other. Once opened, the two browser windows operate independently.

A user of the first and second Browser Windows may interface with the Internet as desired prior to implementing the present invention. When desired, the user navigates (or causes the browser to navigate) to Web page 1, which is received and displayed in the first Browser Window (step 204). Web page 1, as described previously, displayed object containing a graphic within a link tag with a JavaScript argument as the href data, and said JavaScript argument references a SpeakCaption function. Additionally, the user navigates (or causes the browser to navigate) to Web page 2, which is received and displayed in the second Browser Window (step 210).

While the user is viewing Web page 1, the user has the option of listening to an audible representation of the caption embedded in the displayed object or can continue peruse Web page 1 and may interact with Web page 1 in various ways while still having the opportunity to hear any caption embedded in Web page 1. However, if it is determined that the user navigated to a new Web page (step 205) or closed the first Browser Window (step 206), the process implemented by the present invention is terminated since, based on such actions, it is assumed that the user did not want to hear the caption. In the case where the new Web page is similar to Web page 1, the present invention may be practiced using the graphics displayed on the new Web page. Similarly, the browser in the second Browser Window will wait for drag and drop messages (and other appropriate messages) until some other Web page is displayed in the window (step 211) or until the second Browser Window is closed (step 212).

In order to listen to an audible representation of the caption, the user may employ a drag and drop operation. There may be more than one caption embedded in Web page 1. Thus, the user may employ the drag and drop operation to hear one caption, and later, if the user has not navigated to a new page, or closed the browser window, the user may decide to listen to another caption using the same drag and drop operation.

Figure 2B:
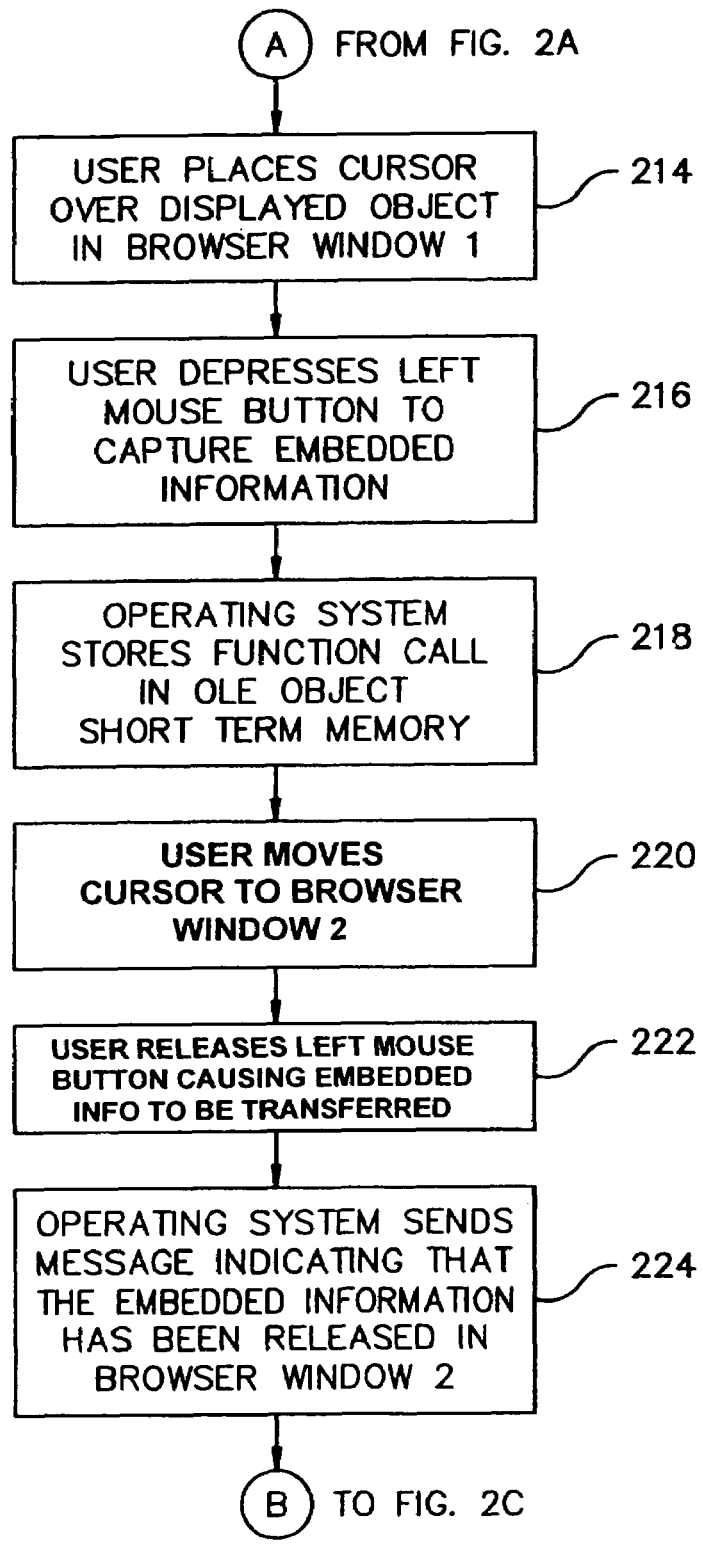

Referring now to FIG. 2B, the drag and drop operation is implemented as follows. First the user places the computer cursor over the displayed object in the first Browser Window that has the embedded caption (step 214). Next, the user depresses the left mouse button while keeping the computer cursor over the displayed object to capture the information embedded in the displayed object (step 216). This causes the computer's operating system to store the function call, including the text of the link (more specifically, the text specified as the href data in the link), into the short term memory associated with an OLE object (step 218). (OLE objects are specific to the Windows operating system although other operating systems recognize similar objects and treat them in similar or analogous manners.) The user continues the drag and drop (transfer) operation by keeping the left mouse button depressed and moving the cursor over to a target area, which in this case is the second Browser Window (step 220). The user then releases the left mouse button, while keeping the computer cursor over the second Browser Window (step 222). Releasing the left mouse button causes the operating system to send a message that an OLE object has been "dropped" (released) at the cursor location, which in this case is in the second Browser Window 2. The message indicates to various active programs running in the second Browser Window that the embedded information has been released (step 224).

Figure 2C:
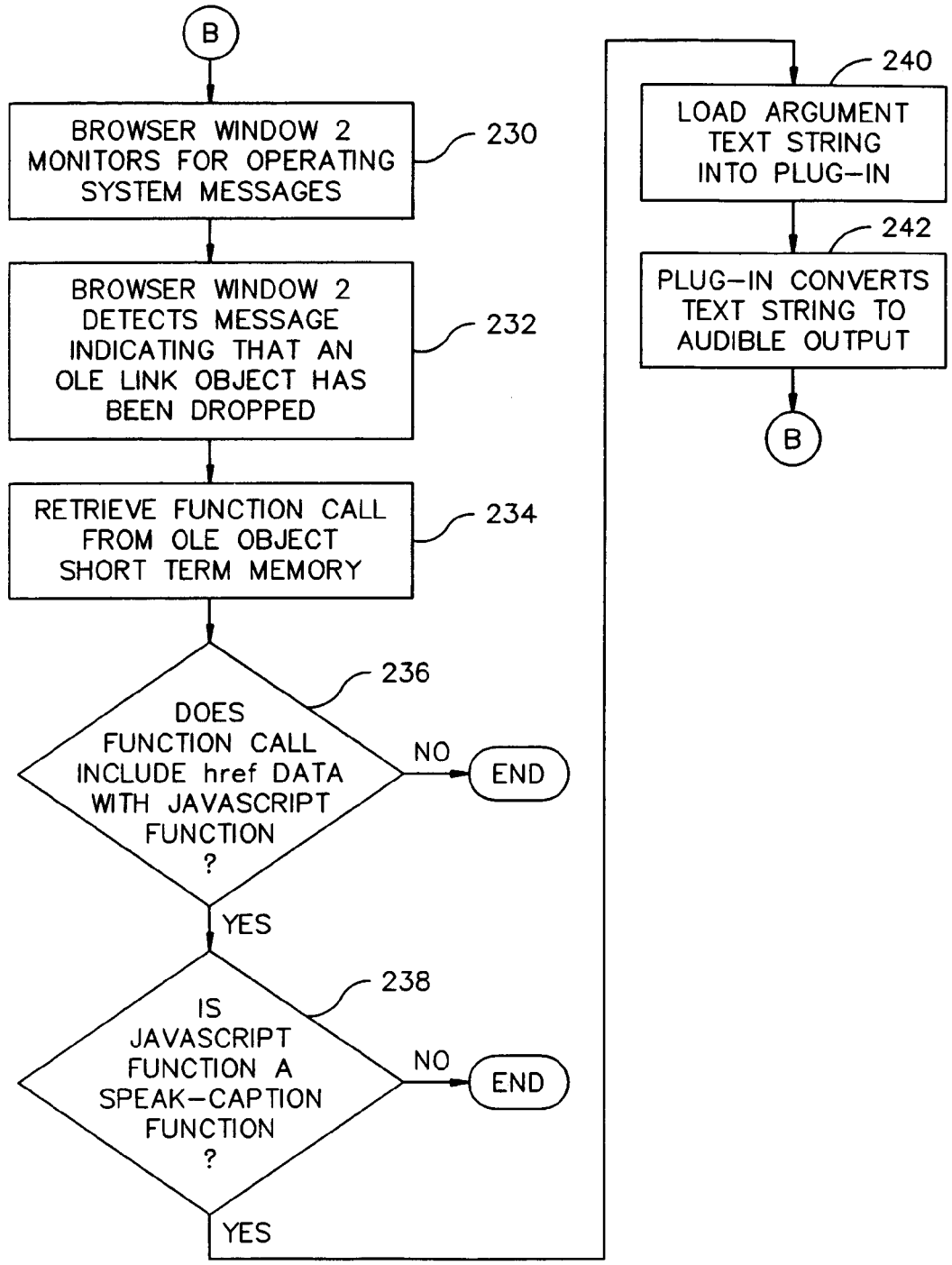

Referring now to FIG. 2C, Web page 2, as previously described, contains JavaScript codes which will execute the SpeakCaption function. The browser continually monitors whether any messages are sent by the operating system to which it must respond or on which it must act (step 230). In particular, the browser monitors whether any messages have been sent from the operating system providing notice that an OLE "link" object has been dropped into the window in which the browser is operating, which in this case is the second Browser Window. When the browser in the second Browser Window detects that an OLE link object has been dropped onto the window by receiving the message sent from the operating system (step 232), the browser retrieves the function call (e.g., href data, link text) from the OLE object short term memory (step 234). Next, the browser determines whether the function call has href data with a JavaScript function (step 236). If so, the browser will attempt to evaluate and execute the function. If it is determined that the function is a SpeakCaption function (step 238), the browser will load the text (a character string) that makes up the argument of the SpeakCaption function into a plug-in program (e.g., Haptek plug-in) (step 240). The text contains commands for the animated head to execute (turn, change shape, speak text), which the plug-in program will implement and execute (step 242). Then the process proceeds back to step 230, where the second Browser Window awaits more captions to be dragged and dropped onto it.

If the JavaScript function was not a SpeakCaption function, the browser would execute the function. If executing the function did not cause the browser to navigate to a new Web page (or close the browser window) the browser would again proceed to step 230 to await more drag and drop actions.

If the href data is an address on the Internet (an URL or Universal Resource Locator), the browser will attempt to navigate to that address. The address could be of a file, image, Web page, etc. The second Browser Window will then display the contents of that address, or an error message if unable to locate it.

If the text was neither a URL, nor a JavaScript function, the browser would attempt to implement the text or return an error. If implementing the text did not cause the browser to navigate to a new Web page (or close the browser window) the browser would again proceed to step 230 to await more drag and drop actions.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of processing information embedded in an object that is displayed, the information being embedded in the object prior to any display of the object and being originally coded into the object, the information being formatted as a function call containing an argument, the method comprising:
   (a) transferring the embedded information from a first Web page displayed in a first browser window to a second Web page displayed in a second browser window;
   (b) storing the function call of the transferred embedded object in a memory;
   (c) retrieving the function call of the transferred embedded object from the memory; and
   (d) executing an operation on the argument of the retrieved function call based on a capability of the second browser window.

2. The method of claim 1, further comprising:
   (e) activating a plug-in program associated with the function call; and
   (f) using the plug-in program to execute the operation on the argument.

3. The method of claim 2, wherein the argument is a text string which is converted into an audible output by the plug-in program.

4. The method of claim 3, wherein the text string is executed by the plug-in program in response to a user clicking on an icon displayed in the second browser window.

5. The method of claim 1, wherein step (a) further comprises:
   (i) using a cursor to select the displayed object in the first browser window;
   (ii) capturing the embedded information;
   (iii) moving the captured embedded information to the second browser window; and
   (iv) releasing the embedded information in the second browser window.

6. The method of claim 1, wherein the embedded information is located within a link tag.

7. The method of claim 1, wherein the function call is selected from the group including a Java function, Javascript function and a VBscript function.

8. The method of claim 1, wherein the function call includes href data.

9. The method of claim 1, wherein the function call includes a variable denoting the language in which the text string is written.

10. The method of claim 1, wherein the function call includes data used to define an image displayed by the second browser window.

11. The method of claim 1, wherein the function call is used to implement a defined function accessed by or embedded in script contained in the second Web page.

12. The method of claim 1 wherein the displayed object is a graphic object.

13. The method of claim 1 wherein the displayed object is a text object having text information embedded therein.

14. An article of manufacture for processing information embedded in an object that is displayed, the information being embedded in the object prior to any display of the object and being originally coded into the object, the information being formatted as a function call containing an argument, the article of manufacture comprising a computer-readable medium holding computer-executable instructions for performing a method comprising:
   (a) transferring the embedded information from a first Web page displayed in a first browser window to a second Web page displayed in a second browser window;
   (b) storing the function call of the transferred embedded object in a memory;
   (c) retrieving the function call of the transferred embedded object from the memory; and
   (d) executing an operation on the argument of the retrieved function call based on the capability of the second browser window.

15. The article of manufacture of claim 14, wherein the computer-executable instructions perform a method further comprising:
  (e) activating a plug-in program associated with the function call; and
  (f) using the plug-in program to execute the operation on the argument.

16. The article of manufacture of claim 15, wherein the argument is a text string which is converted into an audible output by the plug-in program.

17. The article of manufacture of claim 16, wherein the text string is executed by the plug-in program in response to a user clicking on an icon displayed in the second browser window.

18. The article of manufacture of claim 14, wherein step (a) further comprises:
  (i) using a cursor to select the displayed object in the first browser window;
  (ii) capturing the embedded information;
  (iii) moving the captured embedded information to the second browser window; and
  (iv) releasing the embedded information in the second browser window.

19. The article of manufacture of claim 14, wherein the embedded information is located within a link tag.

20. The article of manufacture of claim 14, wherein the function call is selected from the group including a Java function, Javascript function and a VBscript function.

21. The article of manufacture of claim 14, wherein the function call includes href data.

22. The article of manufacture of claim 14, wherein the function call includes a variable denoting the language in which the text string is written.

23. The article of manufacture of claim 14, wherein the function call includes data used to define an image displayed by the second browser window.

24. The article of manufacture of claim 14, wherein the function call is used to implement a defined function accessed by or embedded in script contained in the second Web page.

25. The article of manufacture of claim 14 wherein the displayed object is a text object having text information embedded therein.

26. The article of manufacture of claim 14 wherein the displayed object is a graphic object.

* * * * *